United States Patent
Shuster

(10) Patent No.: US 7,539,736 B2
(45) Date of Patent: May 26, 2009

(54) REMOTE PERSONAL CRITERIA VERIFICATION METHOD

(76) Inventor: Gary Stephen Shuster, 486 E. Rusty Harbor Dr., Fresno, CA (US) 93720

( * ) Notice: Subject to any disclaimer, the term of this patent is extended or adjusted under 35 U.S.C. 154(b) by 322 days.

(21) Appl. No.: 11/029,298

(22) Filed: Jan. 4, 2005

(65) Prior Publication Data

US 2005/0120249 A1    Jun. 2, 2005

Related U.S. Application Data

(63) Continuation of application No. 09/850,838, filed on May 8, 2001, now Pat. No. 6,862,610.

(60) Provisional application No. 60/202,753, filed on May 8, 2000.

(51) Int. Cl.
    *G06F 15/16*    (2006.01)
    *G06F 7/00*    (2006.01)
(52) U.S. Cl. ............................ 709/217; 709/219; 707/3
(58) Field of Classification Search ................. 709/217, 709/219; 713/200, 201; 707/2, 3, 6, 10
    See application file for complete search history.

(56) References Cited

U.S. PATENT DOCUMENTS

| 5,311,594 | A * | 5/1994 | Penzias | 713/183 |
| 6,073,130 | A * | 6/2000 | Jacobson et al. | 707/5 |
| 6,366,903 | B1 * | 4/2002 | Agrawal et al. | 707/2 |
| 6,366,910 | B1 * | 4/2002 | Rajaraman et al. | 707/5 |
| 6,374,259 | B1 * | 4/2002 | Celik | 707/104.1 |
| 6,704,787 | B1 * | 3/2004 | Umbreit | 709/229 |

\* cited by examiner

*Primary Examiner*—William C Vaughn, Jr.
*Assistant Examiner*—Ranodhi N Serrao
(74) *Attorney, Agent, or Firm*—Connolly Bove Lodge & Hutz LLP; Jonathan A. Jaech

(57) ABSTRACT

A method for verifying the identity of users connected to a computer network comprises providing fractional information queries to users, wherein responses to these individual queries are not sufficient to identify the user. This method further comprises receiving responses to these fractional information queries and comparing these responses to data available from within a computer network. A set of potential matches to the user is generated according to these responses and is used in determining whether the set of potential matches is sufficient to identify the user.

20 Claims, 2 Drawing Sheets

REMOTE PERSONAL CRITERIA VERIFICATION METHOD

CROSS-REFERENCE TO RELATED APPLICATION

This application is a continuation of application Ser. No. 09/850,838 filed May 8, 2001 now U.S. Pat. No. 6,862,610, which claims priority pursuant to 35 U.S.C. § 119(e) to U.S. Provisional Application No. 60/202,753, filed May 8, 2000.

BACKGROUND OF THE INVENTION

1. Field of the Invention

The present invention relates to the verification of an individual's identity in a wide area network. More specifically, this invention relates to a method and apparatus for verifying identity using fractional information taken from the user.

2. Description of Related Art

For many years, the global retail market has been characterized as a market in which products are sold from physical locations. In recent years, however, this dynamic has undergone a significant change in response to the increasing popularity of the Internet. It should be appreciated that the Internet is defined here as a collection of interconnected (public and/or private) networks linked together by a set of standard protocols (such as TCP/IP and HTTP) to form a global, distributed network. While this term is intended to refer to what is now commonly known as the Internet, it is also intended to encompass variations which may be made in the future, including changes and additions to existing standard protocols. Using the Internet, businesses can now more readily sell their products to a vast number of customers beyond local boundaries. Business transacted primarily over computer networks such as the Internet is commonly known as electronic commerce and will herein be referred to as such.

Systems for wide-area networks, such as the Internet, are presently limited, however, in the amount of security they offer to consumers and businesses against fraud. In particular, in electronic commerce it is commonplace to approve electronic transactions without ever seeing the purchaser or viewing any identifying material (such as a drivers license). In addition to financial fraud, the Internet has also experienced a growing problem with regards to age representation fraud, whereby underage individuals are able to gain unauthorized access to many websites on the Internet by claiming to be older than they actually are. To prevent such unauthorized access (and in general, to prevent other forms of fraud and theft), it is desirable to confirm the identity and/or age of the user requesting access to restricted material by checking an identifying code supplied by an unknown user against publicly available identity databases. For example, if a social security number is supplied, this information can then be used to verify other information about the user, such as the user's age, gender, credit history, state of residence, etc. For further example, many Internet age-verifying services operate chiefly by obtaining a user's credit card number over the Internet.

While it is certainly possible in an electronic commerce transaction to request identifying information about an individual, such as a full social security number, credit card number, or a telephone number, individuals are in many situations reluctant to give such information for fear of compromising their privacy or risking loss of control over their confidential identifying and account information. Individuals may be particularly reluctant to share identifying information when the reputation of the requesting entity is not known to the user, and its trustworthiness is therefore in question. Currently, no system exists that enables users to verify certain facts about themselves, such as their age, without forfeiting their privacy and supplying confidential identity numbers to a potentially untrustworthy requester. If these disadvantages could be overcome, it is anticipated that more electronic commerce transactions would occur than presently take place. It would thus be advantageous to implement an electronic business method and system which enables businesses to verify the identity of such clients at a minimal risk to the clients' privacy and without needing to posses confidential identity numbers belonging to the clients.

SUMMARY OF THE INVENTION

In an embodiment of the invention, a method and apparatus for verifying the identity of users connected to a computer network comprises providing fractional information queries to users, wherein responses to individual ones of these queries are not sufficient to identify the user. In combination, however, the responses to the queries have a very high probability of uniquely identifying the user. This method further comprises receiving responses to these fractional information queries and comparing these responses to data available from a secure, preferably independent source within a computer network. A set of potential matches to the user is generated according to these responses by the secure source. If more than one match is discovered, additional information may be supplied by the user until the user's identity is confirmed. At the same time, the potentially untrustworthy site need not ever posses any identifying information while still being assured that the user is who she claims to be.

A more complete understanding of a method and apparatus for identifying the identity of individuals will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention is directed towards a method and apparatus for verifying the identity of individuals in a wide area network. More specifically, this invention is directed towards verifying an individual's identity using fractional information taken from the user.

Figure 1:
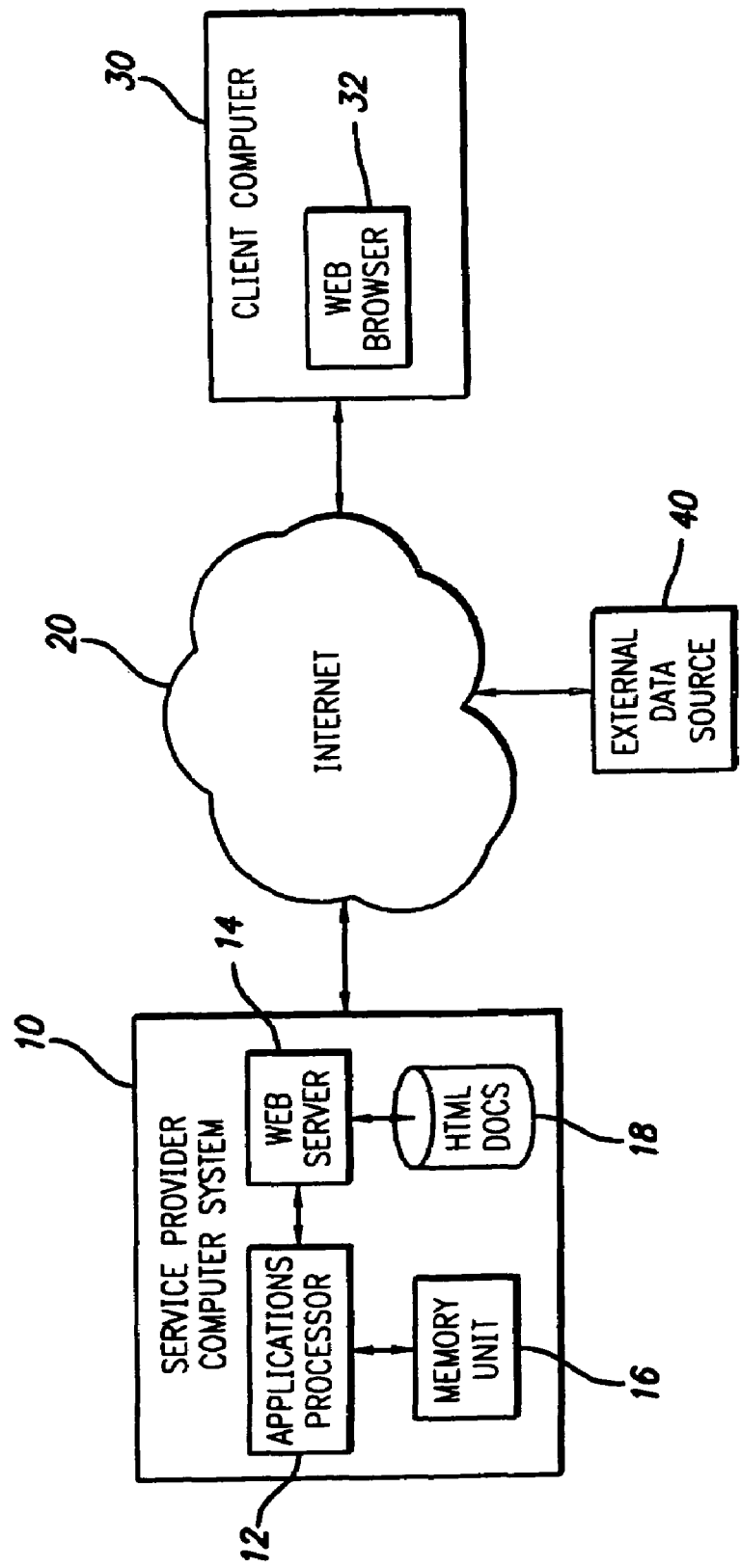
FIG. 1 is block diagram demonstrating a preferred embodiment of the invention.

Referring first to FIG. 1, a block diagram is illustrated of a wide area network employing a method and apparatus according to an embodiment of the invention. Although the invention is especially suitable for implementation on a system as will be described, the method may also be effectively implemented on other systems. It is anticipated that the present invention operates with a plurality of computers that are coupled together on a wide area network, such as the Internet 20, or other communications network. FIG. 1 depicts such a network that includes a service provider computer system 10, a client computer 30, and an external data source 40. The service provider computer system 10 is further comprised of an applications processor 12 coupled to a memory unit 16 and a Web server 14 connected to an HTML (Hyper-Text Markup Language) documents database 18.

It should be appreciated that Web server 14 accesses a plurality of Web pages, distributable applications, and other electronic files containing information of various types stored in the HTML documents database 18. As a result, Web pages may be viewed on various web-enabled computers in a given network, such as a client computer 30. For example, a particular Web page or other electronic file may be viewed through a suitable application program residing on the client computer 30 such as a browser 32, or by a distributable application provided to the client computer 30, by the Web server 33. It should be appreciated that many different information retrieval devices, many different Web servers, and many different search servers of various types may be communicating with each other at the same time.

As is generally known in the art, a client identifies a Web page it wishes to retrieve by communicating an HTTP (Hyper-Text Transport Protocol) request from the browser application 32. The HTTP request includes the Uniform Resource Locator (URL) of the desired Web page, which may correspond to an HTML document stored in the HTML documents database 18. The HTTP request is then routed to the Web server 14 via the Internet 20. The Web server 14 then retrieves the HTML document identified by the URL, and communicates the HTML document across the Internet 20 to the browser application 32. The HTML document may be communicated in the form of plural message packets as defined by standard protocols, such as the Transport Control Protocol/Internet Protocol (TCP/IP).

The external data source 40 is preferably a secure database run by an independent service provider. Service providers and other entities that desire to practice the method to identify individuals may subscribe to the database in advance of performing the search. They may be assigned an encryption key by the database service to ensure the security of messages exchanged with the external data provider. This is particularly desirable where the identity information to be transmitted back from the database is especially sensitive or confidential, for example, where it comprises an individual's credit history. For other applications, such as age verification, the information transmitted back may comprise a bare confirmation that the individual has (or has not, as the case may be) attained the required age. Such information is unlikely to require encryption.

Figure 2:
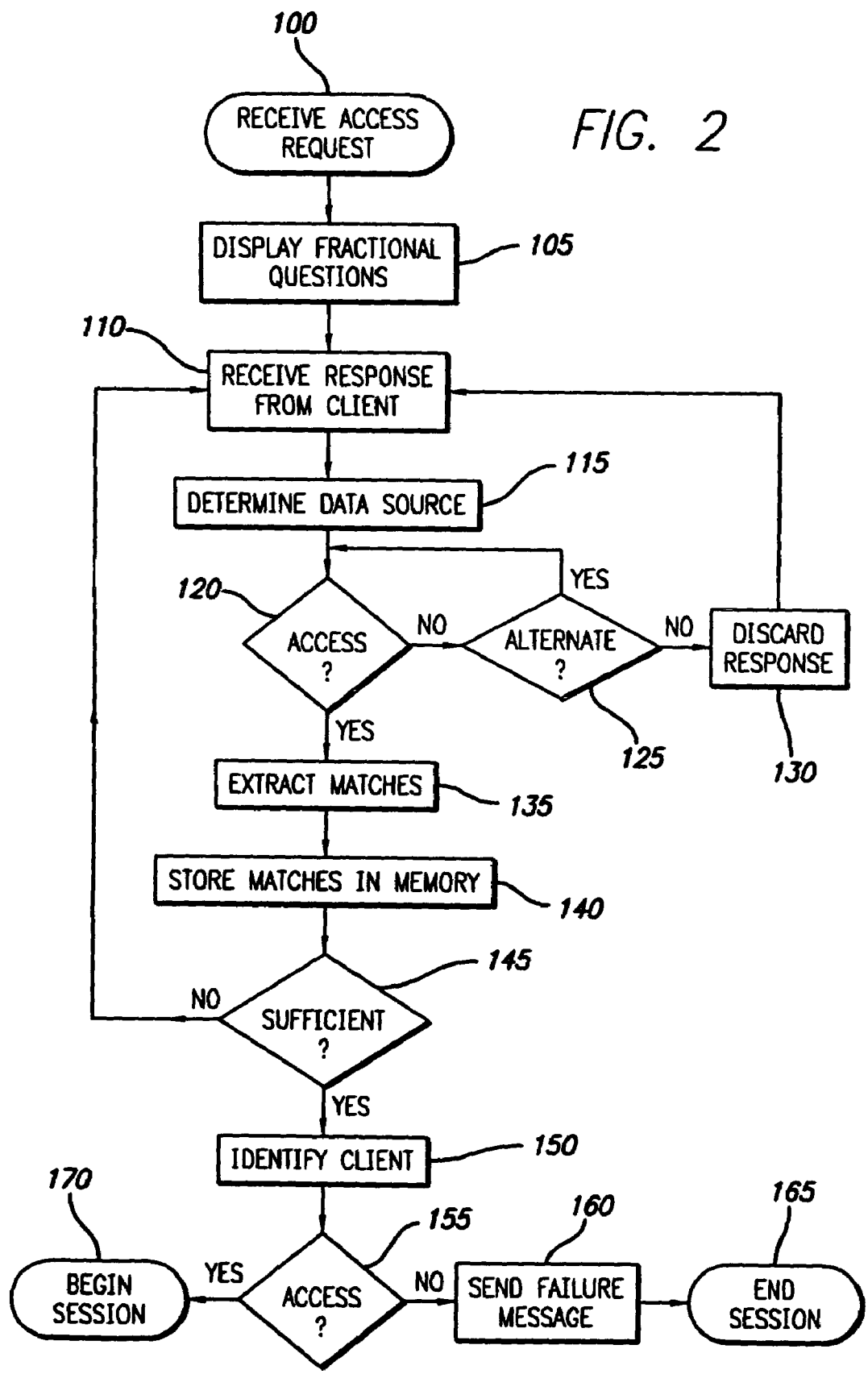
FIG. 2 is a flow chart illustrating the steps for identifying a client according to an embodiment of the invention.

In FIG. 2, a flow chart illustrating the steps for identifying a client according to an embodiment of the invention is shown. The identifying procedure begins at step 100 when the service provider computer system 10 receives a website access request from a client computer 30. At step 105, the service provider computer system 10 responds to this request by prompting the client to answer several "fractional questions". It should be appreciated that a "fractional question" is defined hereinafter as a question where only partial information is asked (e.g., the first three digits of a phone number, the last four digits of a social security number, etc.). For example, the client may be asked to supply his age, last four digits of his social security number, last four digits of his telephone number, and first three numbers of his street address (inserting spaces or zeros if the street address has less than three digits). Such information will preferably not contain data of a nature that will enable ready identification of the individual except by using an extensive database of social security numbers, telephone numbers, addresses, and etc., all linked to the desired identity data. For example, it would generally not be desirable to include the entire zip code or street address in such information, because doing so could make the task of identifying the user too easy or even trivial.

The procedure continues at step 110 with the service provider computer system 10 receiving a response to individual fractional questions from the client. Beginning with the first received response at step 110, the service provider computer system 10 determines which external data source 40 it will use to confirm those particular responses. Access to the external data source 40 chosen at step 115 is then requested at step 120. If access is granted to the external data source 40 at step 120, then the procedure continues with the extraction of all matches to the fractional information provided by the client which are included in that particular data source 40. If for some reason the primary database is not available or has no data matching the fractional information, the service provider computer system 10 may attempt to use an alternate data source 40 at optional step 125. If an alternate data source 40 is found at step 125, then access to this data source is requested at step 120, otherwise, this particular client response is discarded at step 130, followed by a return to step 110 where the procedure is repeated for the next client response. In an alternative embodiment, certain of the fractional information are withheld from each database provider, making it impossible for any single database provider to possess the identity of the requestor. Instead, the database responses may be combined and analyzed by an independent, trusted source, thereby adding another layer of privacy and security.

Once the extraction of all fractional information matches is made at step 135, the procedure continues at step 140 with these matches being stored in the memory unit 16 of the service provider computer system 10. At step 145, the service provider computer system 10 then determines whether the matches stored in its memory unit 16 are sufficient to identify the client. In an exemplary embodiment, a service provider computer system 10 may contain "n" number of matches in its memory unit 16 at step 140. If this particular service provider were only concerned with its clients being over a certain age, the sufficiency criterion at step 145 may be fulfilled if all "n" individuals satisfy the service provider's age requirements. In another example, a service provider may be more concerned with financial fraud, in which case a sufficiency criterion that identifies a specific individual would be more appropriate.

If the number of matches stored in the memory unit 16 satisfy the aforementioned sufficiency criterion, then the client is identified at step 150; otherwise, the service provider computer system 10 returns to step 110 where the procedure is repeated with respect to additional responses received from the client. For example, more detailed information in the same classes may be requested (for example, an additional digit of an identity number or additional letter of a name), or information from an entirely new class. It should be appreciated that if and when the above procedure requires an additional iteration at step 145 (i.e., the set of matches stored in the memory unit 16 do not satisfy the sufficiency criterion), the extracted set of matches in one iteration are used to begin the following iteration resulting in a set of matches that is smaller or equal in size to the set of matches found in the previous iteration.

Once a client is identified at step 150, the procedure continues at step 155 where the service provider computer system 10 determines whether to grant access to this particular client. It should be appreciated that this determination may vary according to the policies of each service provider. With respect to age, for example, one service provider may grant access to a client of a particular age while another service provider may not. If access is granted to the client at step 155, then the online session pertaining to that particular service provider begins at step 170; otherwise, a failure message is sent to the client at step 160 and the session is terminated at step 165. The service provider never possesses the specific identity of the client unless authorized by the client to receive such information.

Generally, it should be appreciated that the amount of fractional information provided by the user is an important aspect of the invention. For example, if eight out of nine digits of a social security number must be supplied, the privacy and confidentiality of the user may not be adequately protected. On the other hand, if too little unique information is supplied, for example, only one digit of the number, then the task of identifying the user may either not be possible, or may take too long. It is desirable, therefore, in the design of the specific identifying query to balance the speed with which an individual may be identified against the need to protect privacy and confidentiality. An appropriate query may be selected by one skilled in the database and statistical arts. It is further desirable that the query be impracticable to complete except using the most advanced databases that are available, so that the entities capable of performing the identity checking will be relatively few, and therefore, relatively more secure. It is anticipated that the database provider will be motivated to formulate a query structure that is perceived as very secure by the vast majority of users, in order to attract as much identity-checking business as possible.

Having thus described a preferred embodiment of a method and apparatus for identifying the identity of individuals, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A method for determining whether a remote client connected to a computer network meets predetermined criteria, comprising:

providing at least one fractional information query to a client adapted for prompting a user of the client to answer a fractional question requesting only partial information of identifying indicia, wherein the partial information is not sufficient to identify the user and omits a portion of the identifying indicia such that the complete identifying indicia corresponding to the user cannot be readily ascertained;

generating at least one set of potential matches to the user of the client from a response to the at least one fractional question, using at least one database of identity information and accessing a plurality of independent external databases of identity information;

determining whether all of the potential matches satisfy the predetermined criteria comprising a user age greater than a predetermined age threshold;

searching an alternate one of the independent external databases, if a first one of the independent external databases does not provide a record matching the response to the at least one fractional information query; and signaling whether the user of the remote client satisfies all of the predetermined criteria as determined by the determining step.

2. The method of claim 1, further comprising repeating the providing step, the generating step and the determining step until all of the potential matches from the determining step satisfy the predetermined criteria.

3. The method of claim 2, wherein the repeating step further comprises using the set of potential matches from an earlier iteration to select a fractional question for a subsequent iteration.

4. The method of claim 1, further comprising repeating the providing step, the generating step, and the determining step until an individual record in the database is identified based on responses to fractional questions.

5. The method of claim 4, wherein the signaling step further comprises confirming an identity of the user of the client as described by the individual record after the repeating step.

6. The method of claim 1, further comprising recording the responses to fractional questions.

7. The method of claim 1, further comprising receiving the responses from a plurality of different users so as to distinguish between responses from each remote user.

8. A system for verifying the identity of users connected to a computer network, comprising:

a server connected to the computer network, the server comprising a processor operably associated with a memory, the memory holding a data management application operable in association with the server to provide the functions of:

providing at least one fractional information query to a client adapted for prompting a user of the client to answer a fractional question requesting only partial information of identifying indicia, wherein the partial information is not sufficient to identify the user and omits a portion of the identifying indicia such that the complete identifying indicia corresponding to the user cannot be readily ascertained;

generating at least one set of potential matches to the user of the client from a response to the at least one fractional information query, using at least one database of identity information and accessing a plurality of independent external databases of identity information;

determining which of the potential matches satisfy predetermined criteria comprising a user age greater than a predetermined age threshold;

searching for an alternate one of the independent external databases, if a first one of the independent external databases does not provide a record matching the response to the at least on fractional information query; and signaling whether the user of the remote client satisfies all of the predetermined criteria as determined by the determining step.

9. The system of claim 8, wherein the application functions further comprise repeating the providing step, the generating step and the determining step until all of the potential matches from the determining step satisfy the predetermined criteria.

10. The system of claim 9, wherein the repeating step of the application functions further comprises using the set of potential matches from an earlier iteration to select a fractional information query for a subsequent iteration.

11. The system of claim 8, wherein the application functions further comprise repeating the providing step, the generating step, and the determining step until an individual record in the database is identified based on responses to fractional information queries.

12. The system of claim 11, wherein the signaling step of the application functions further comprises confirming an identity of the user of the client as described by the individual record after the repeating step.

13. The system of claim 8, wherein the application functions further comprise recording responses to fractional information queries.

14. The system of claim 8, wherein the application functions further comprise receiving the responses from a plurality of different users so as to distinguish between responses from each remote user.

15. A computer-readable storage medium encoded with instructions configured for:

providing at least one fractional information query to a client, the query configured to ask a user of the client a fractional question regarding the user's identity, the fractional question requesting only partial information of identifying indicia, wherein the partial information is not sufficient to identify the user and omits a portion of the identifying indicia such that the complete identifying indicia corresponding to the user cannot be readily ascertained;

generating at least one set of potential matches to the user of the client from a response to the at least one fractional question, using at least one database of identity information and accessing a plurality of independent external databases of identity information;

determining whether the potential matches satisfy predetermined criteria comprising a user age greater than a predetermined age threshold;

searching an alternate one of the independent external databases, if a first one of the independent external databases does not provide a record matching the response to the at least one fractional information query; and signaling whether the user of the remote client satisfies all of the predetermined criteria as determined by the determining step.

16. The computer-readable storage medium of claim 15, further comprising encoded instructions for repeating the providing step, the generating step and the determining step until all of the potential matches from the determining step satisfy the predetermined criteria.

17. The computer-readable storage medium of claim 16, further comprising encoded instructions for using the set of potential matches from an earlier iteration to select a fractional question for a subsequent iteration.

18. The computer-readable storage medium of claim 15, further comprising encoded instructions for repeating the providing step, the generating step, and the determining step until an individual record in the database is identified based responses to fractional questions.

19. The computer-readable storage medium of claim 15, further comprising encoded instructions for confirming an identity of the user of the client as described by the individual record after the repeating step.

20. The computer-readable storage medium of claim 15, further comprising encoded instructions for recording responses to fractional questions.

* * * * *

UNITED STATES PATENT AND TRADEMARK OFFICE
CERTIFICATE OF CORRECTION

PATENT NO. : 7,539,736 B2
APPLICATION NO. : 11/029298
DATED : May 26, 2009
INVENTOR(S) : Gary Stephen Shuster It is certified that error appears in the above-identified patent and that said Letters Patent is hereby corrected as shown below:

<u>Column 8, Line 19</u> - In Claim 18, before "responses" please add --on--.

Signed and Sealed this

Twenty-second Day of December, 2009

David J. Kappos
*Director of the United States Patent and Trademark Office*